United States Patent [19]

Leavitt et al.

[11] Patent Number: 4,790,323

[45] Date of Patent: Dec. 13, 1988

[54] FLOW IMAGING DETECTOR

[75] Inventors: Steven C. Leavitt, Hampstead, N.H.; David Lipschutz, Lexington, Mass.; Stephen E. Lincoln, Boxford, Mass.; Karl Thiele, Methuen, Mass.; Paul A. Magnin, Andover, Mass.

[73] Assignee: Hewlett-Packard Company, Palo Alto, Calif.

[21] Appl. No.: 926,078

[22] Filed: Nov. 3, 1986

[51] Int. Cl.⁴ ............................................. A61B 10/00
[52] U.S. Cl. ............................. 128/661.09; 73/861.25
[58] Field of Search ............... 128/663; 73/861.25; 364/728, 819

[56] References Cited

U.S. PATENT DOCUMENTS

| | | | |
|---|---|---|---|
| 4,542,657 | 9/1985 | Barber et al. | 128/663 X |
| 4,583,409 | 4/1986 | Lannuzel et al. | 73/861.25 |
| 4,612,937 | 9/1986 | Miller | 73/861.25 X |
| 4,622,977 | 11/1986 | Nomekawa et al. | 73/861.25 X |
| 4,671,294 | 6/1987 | Magnin et al. | 128/663 |
| 4,680,739 | 7/1987 | Lannuzel | 128/663 X |
| 4,713,971 | 12/1987 | Johannes | 73/861.25 |

OTHER PUBLICATIONS

Brandestini, M. A. et al., "Blood Flow Imaging Using a Discrete-Time Frequency Meter", 1978 UTS Symp. Proceedings, IEEE Cat. #78 CH 1344-1SU, Cherry Hill, N.J., U.S.A. (Sep. 25-27, 1978).

*Primary Examiner*—Francis J. Jaworski
*Attorney, Agent, or Firm*—Donald N. Timbie

[57] ABSTRACT

Estimates of the average velocity and turbulence of blood flow are determined by weighting the instantaneous frequencies of a returning Doppler signal. The weighting can be chosen so that the estimates are optimized. The weighting can be chosen so as to duplicate the algorithm of other ultrasound flow imaging systems.

9 Claims, 2 Drawing Sheets

FLOW IMAGING DETECTOR

BACKGROUND OF THE INVENTION

Signals representing blood velocity may be derived by transmitting successive bursts of a few cycles of acoustic carrier wave along each of a plurality of radial lines with an electro-acoustic transducer and sampling the electrical signals produced by echos reflected from targets along the line at intervals separated by one quarter of the period of the carrier wave so as to drive an in phase quadrature component I and a quadrature phase quadrature component Q. The arc-tangent of I/Q is the angle between the components. In accordance with the Doppler principle, the acoustic wave impinging on the transducer will have the same frequency as the carrier wave so as to produce an angle of 90 degrees if the reflection is from a stationary target, a greater frequency than the carrier wave so as to produce an angle greater than 90 degrees if the target is moving toward the transducer and a lesser frequency than the carrier wave so as to produce an angle less than 90 degrees if the target is moving away from the transducer. The change in the angle of reflection from a target on an successive transmission is therefore an indication of the Doppler frequency shift from which the velocity of the target can be determined.

In apparatus described by Brandestini in an article entitled TOPOFLOW-A DIGITAL FULL RANGE DOPPLER VELOCITY METER and published in the September 1978 issue of *IEEE Transactions on Sonics and Ultrasonics*, an estimate of the velocity of target is determined from an average of the angles acquired from samples of its reflections of a plurality of acoustic pulses transmitted along the same line.

Because this does not take into account the amplitude of the reflection, the velocity so attained is not the average velocity. The straight forward way of attaining the average velocity would be to carry out the function of the following equation in which S(w) is the Fourier power spectrum of the sampled echo.

$$W = \frac{\int S(w) \, w \, dw}{\int S(w) \, dw} \quad (1)$$

In this equation the magnitude of each frequency is multiplied by that frequency, the products are added together so as to derive the numerator and the denominator is the sum of the magnitudes. Whereas this can be done by using an FFT, it is expensive.

In apparatus described in a European patent application number 83104067.0 filed on 4/26/83, an average velocity is derived that is very close to the precise value by using autocorrelation techniques. In particular, the I and Q components of a sample of the reflection of one burst from a target are multiplied by the conjugate of the I and Q components of a sample of the reflection of the next burst from the same target. Thus if seven bursts are transmitted along a line, there are six multiplications. The real components of all multiplications are averaged as are the imaginary components. The angle having a tangent determined by the ratio of the average of imaginary components to the average of the real components resulting from the multiplications can be shown to correspond to the average or mean Doppler frequency, and this can be translated into the average velocity.

In practice the amplitude of one set of I and Q components can be much greater than the others due to factors not related to the velocity of particles of interest so that they can dominate the averages and introduce considerable error in the velocity.

In U.S. patent application bearing Ser. No. 06/765,897 filed on 8/14/85 and entitled "Pulsed Doppler Flow Mapping Apparatus", these problems are overcome, but both types of apparatus suffer from the need for multipliers having relatively large numbers of bits. This significantly increases the cost so that the usual design reduces the number of bits and suffers from a lack of accuracy.

At the present time there is doubt as to whether the latter approach or the Brandestini approach is to be preferred. In some situations, one is better than the other.

BRIEF SUMMARY OF THE INVENTION

In accordance with this invention, the Brandestini structure is used to derive a velocity estimate corresponding to the change in the phase angle resulting from the components I and Q for a current burst and components I and Q for the previous one, and means are provided for weighting the values of the velocities thus determined from all successive bursts. The weighting can be such as to produce a result identical to that attained by Brandestini or a result identical to that attained by the apparatus of the European application referred to.

An important aspect of the invention is that the weighting can be such as to take into account a number of a priori factors e.g. the change in the signal to noise ratio resulting from the time gain control, TGC, that is usually used to compensate for the fact that the amplitude of reflections reaching the transducer decreases with distance from the transducer at which they were reflected.

The magnitude and phase of Doppler echoes should remain the same for adjacent correlated samples for each target. If they differ significantly, it is a sign of a noisy frequency sample so that the velocity determined from it should be given low weight.

Similarly, small differences in the phase angle determined from the bursts are indicative of clutter and should be given low weight.

If the cross power term for two vectors, i.e. the product of their magnitudes, is low, the velocity estimate is largely based on noise and should be given low weight. If the cross power term is large, the velocity estimates are dominated by clutter and should be given a low weight.

There may well be other factors which could be taken into account by virtue of the ability of the apparatus of this invention to weight the velocity estimates.

Another important use of the weighting ability of this invention is that an average of angles can be made in such manner that the vectors for which $\sqrt{I^2 + Q^2}$ is less than a given value may be eliminated from the average.

A benefit of the autocorrelation system described in the European application referred to is that a measure of blood turbulence can be made, but the present invention yields a superior estimate of blood turbulence because other apriori factors can be taken into account.

DETAILED DESCRIPTION OF THE INVENTION

Figure 1:
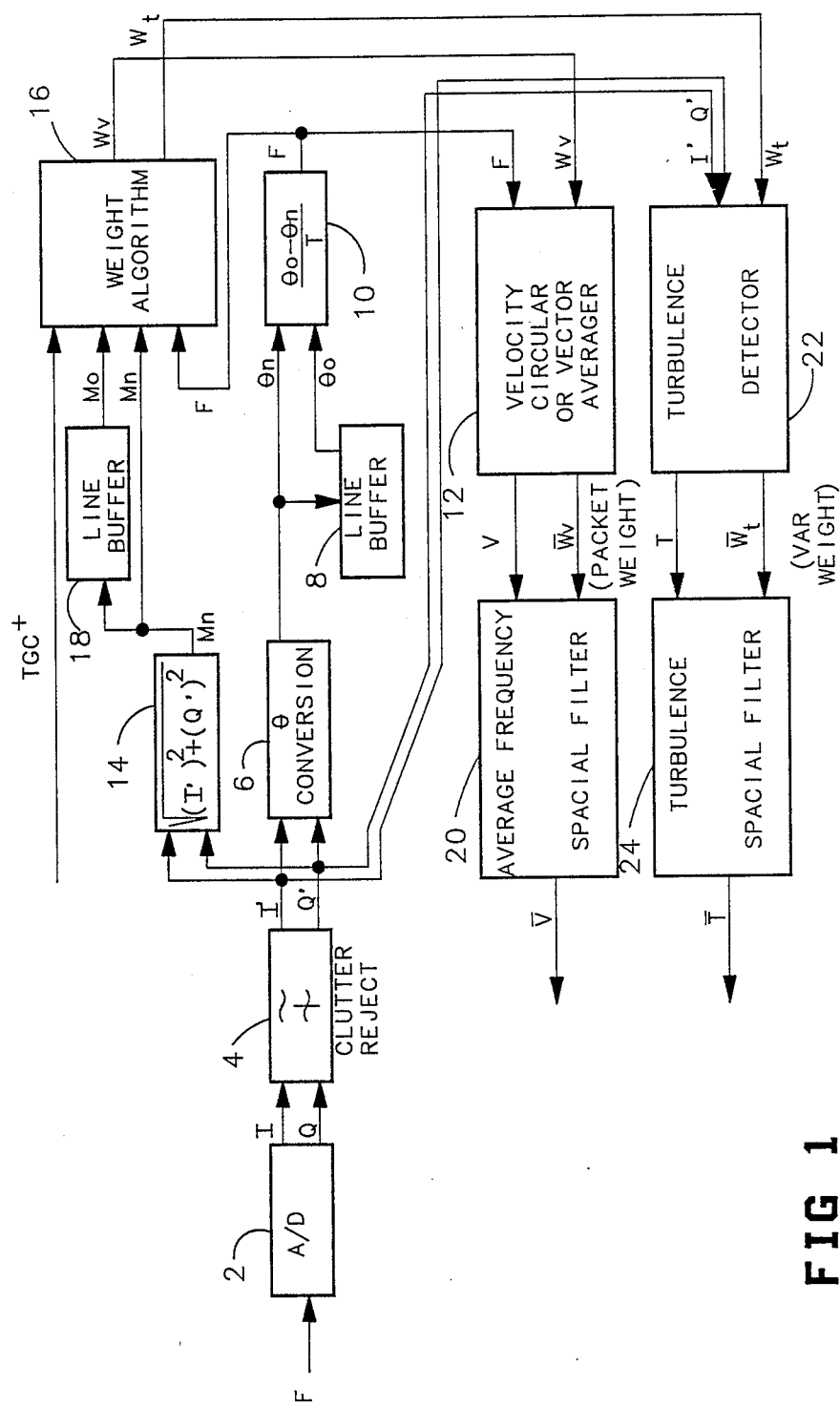
FIG. 1 is a block diagram of apparatus incorporating the invention in which desired weighting factors for the velocity estimate can be derived and used.

In FIG. 1, signals derived from a transducer that may be baseband, RF or IF are applied to a digital quadrature A/D sampler 2 so as to derive signals I and Q. After passing through a clutter filter 4 that eliminates low frequency components by subtracting the signals of one line from the corresponding signals of the next, quadrature signals I' and Q' are formed. In accordance with the Brandestini teaching, the signals I' and Q' are applied to a $\theta$ conversion device 6 that includes means, not shown, for deriving the ratio of I'/Q' and a ROM lookup table that provides the angle whose tangent is I'/Q'. This is done for all the quadrature samples of the signals corrresponding to reflections from points along the line which the bursts were transmitted. The values of $\theta$ are stored in a line buffer 8. The current value of $\theta$, $\theta n$, and the corresponding value, $\theta o$, from the same target that resulted from the previous burst are applied to a device 10 that, as indicated, derives the difference between $\theta o$ and $\theta n$ and divides that difference by T, the time between bursts so as to produce a signal F equal to the instantaneous Doppler frequency. There is no need to convert this to velocity as they are directly related. The signal F for each sample is proportional to instantaneous velocity and is applied to a circular or vector averager 12 that could be the same as any one of the circular averagers described in the U.S. patent application. The circular averager 12 provides the average frequency F of the reflection of each burst from a target.

In accordance with this invention, the signals I' and Q' are applied to means 14 for deriving $\sqrt{(I')^2+(Q')^2}$, which is the magnitude Mn of the current sample. This signal is applied directly to a means 16 that produces a weighting signal $W_v$ in accordance with a weighting algorithm. The means 16 can be a ROM, a microprocessor or other hardware. The signal for current magnitude Mn is also applied to a line buffer 18. The output of the line buffer 18 is applied to the means 16 and is the magnitude Mo of the sample from the same target that was attained from the previous burst. Various types of system information such as the TGC signal that increases receiver amplifier gain after each burst is transmitted may also be applied to the means 16 for carrying out the weighting algorithm. If the TGC signal is used, it causes the weighting signal $W_v$ to decrease with time because the signal to noise ratio decreases and makes the velocity estimates less reliable. The signal F may also be supplied to the means 16 so as to reduce $W_v$ for lower frequencies that correspond to slow moving tissue.

The weighting signal $W_v$ derived by the means 16 is applied to the circular or vector averager 12 so as to control the effect that the signal F has on the average velocity V. The averager 12 also supplies a signal $\overline{W}_v$ related to the weights for the samples for each target. If desired, these outputs can be applied to an average velocity spatial filter 20 so as to smooth the variation in V between adjacent targets. If the weighting algorithm carried out by the means 16 provides a weighting signal $W_v$ equal to Mo·Mn, the average velocity V at the output of the vector averager 12 will be the same as that obtained by the apparatus described in the European patent application referred to. On the other hand, if $W_v$ equals unity, the signal V will be the same as would be derived by Brandestini.

The weighting algorithm carried out by the means 16 could be such as to make the weighting signal $W_v=0$ so as to cause the signal F applied to the vector averager 12 to have no effect if the new magnitude Mn provided by the means 14 is less than some threshold value.

In accordance with another aspect of this invention, a turbulence estimate can be made from weighted factors. In order to provide an indication of the degree of turbulence in the blood, the variance of the frequency power spectrum can be measured so as to indicate the degree of "spread" of the velocities or frequencies. Prior art has shown that this estimate of turbulence can be calculated in the time domain using the following autocorrelation function in which R(1) is the autocorrelation of the I', Q' signals with a lag of one, R(o) is the same function at a lag of zero, $X(k)=I'(k)+jQ'(k)$ and N is the number of I'Q' samples for a given target.

$$\sigma^2 = \left| 1 - \frac{R(1)}{R(0)} \right| = \left| 1 - \frac{\sum\limits_{}^{N} x(k) \cdot x^*(k+1)}{\sum\limits_{}^{N} |x(k)|^2} \right| \quad (2)$$

The problem with this algorithm is that it can not discriminate between electrical noise and true particle turbulence. In this invention it is proposed that the individual samples of the autocorrelation function be weighted by a reliability criterion Wt that maximizes the use of a priori information so that samples dominated by electrical noise can be weighted less. Such weighted variance can be expressed as follows:

$$T = \left| 1 - \frac{\sum\limits_{}^{N} x(k) \cdot x^*(K+1) \cdot W_t(k)}{\sum\limits_{}^{N} |x(k)|^2 \cdot W_t(k)} \right| \quad (3)$$

These functions are carried out in FIG. 1 by applying I' and Q' appearing at the output of the clutter filter 4 and a weighting signal Wt from the means 16 to a turbulence detector 22.

For example, the TGC signal indicates the noise level to be expected for a given sample with the circuit being used. If the magnitude of the I', Q' pair is below that noise level, then it would be desirable to weight that specific I', Q' pair low, so that the specific value for Wt is small. Other factors could be used to determine Wt.

A turbulence detector 22 carries out the calculation of equation (3) and also provides an average W of the weighting factors Wt. T and Wt are supplied to a turbulence spatial filter 24 that outputs a display signal T for turbulence. T may be displayed in a color other than V and subsequent processing that is not a part of this invention will determine whether V or T is to be displayed or what combination of them is to be displayed.

Figure 2:
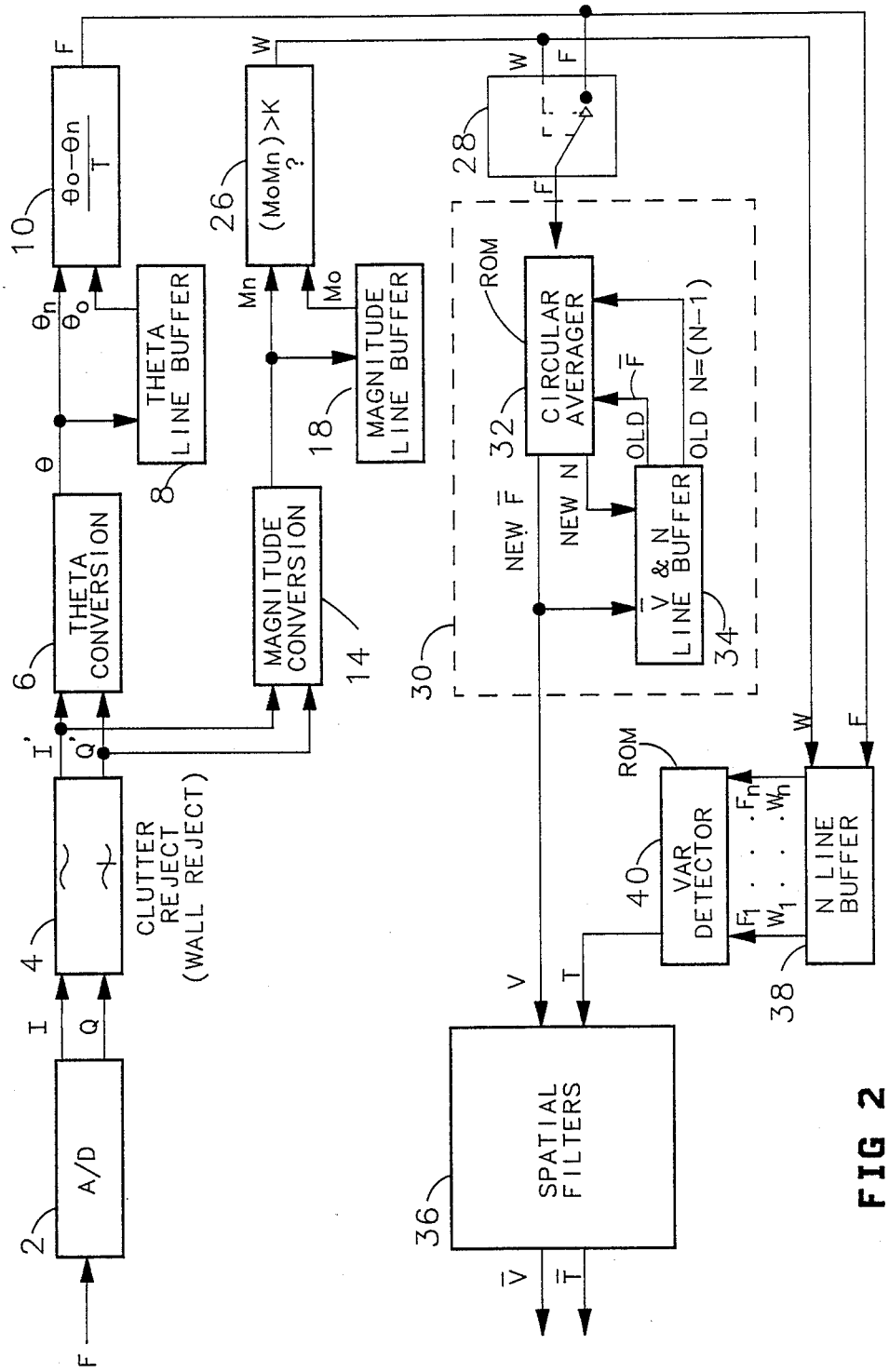
FIG. 2 is a block diagram of apparatus incorporating this invention in which a threshold value of $\sqrt{I^2+Q^2}$ is used to determine whether a velocity estimate from these I and Q vectors is to be used in the derivation of the average angle.

Reference is now made to FIG. 2 in which the same weighting factor W is used in determining F and turbulence and has a value of unity or zero depending on whether $(I')^2+(Q')^2$ is greater than or less than an arbitrarily selected threshold value. In deriving an estimate of velocity or turbulence the amplitudes of I', Q' are ignored.

The values of Mn and Mo are applied to a means 26 for determining whether Mn'Mo is greater than a threshold value K. If it is, W=1 and if not, W=0. The output F from the ROM 10 is applied to a switch 28 that is closed if W=1 and open if W=0. The values of F that pass through the switch 28 are applied to a means 30 for deriving an average of the values of F for each target. The latter function can be performed in a number of ways but is illustrated as being comprised of a circular averager 32 and a radial line buffer connected as shown. In FIG. 1 the output of 12 is V as in the output of 30 in FIG. 2. The weighting of the F's in each case derives a value directly related to the estimate of velocity so that it is referred to as V.

The signal V at the output of 30 is applied to spatial filter 36 that averages the velocity estimate V for adjacent targets so as to yield $\overline{V}$ that is used for each target.

In FIG. 2 a turbulence estimate is determined by applying W and F to a radial line buffer 38 so that all the values of F for each target along the radial line are available. The same is done for the weights W of 0 or 1. A ROM 40 reads all the values of F and W for each target, derives therefrom a turbulence estimate T for that target e.g. in accordance with the following equation.

$$T = 1 - \frac{\sqrt{\left[\sum_{i=1}^{N}(Wi \cdot \cos(Fi))\right]^2 + \left[\sum_{i=1}^{N}(Wi \cdot \sin(Fi))\right]^2}}{\sum_{i=1}^{N} Wi}$$

The values of i correspond to the different F's and W's for each target. The signal T at the output of 40 is applied to the spatial filter 36 that averages the turbulence estimates T for adjacent targets so as to yield $\overline{T}$ that is used for each target.

The equation 4 derives the ratio between the vector sum of the Fs when they are assumed to have the same magnitude and the number of vectors. This actually disregards the actual amplitudes of the vectors F. F can be considered as a vector because it is derived from the difference of two angles and can be represented as a unity magnitude vector at the difference angle. Considering F as a vector implies that the instantaneous frequency is limited to a given range determined by the Nyguist criteria as applied to a pulsed Doppler system.

Whereas turbulence could be calculated in other ways, e.g. you could determine the variance, $\sigma^2$, of F, the importance is that a weighting factor is used which is related to the condition present.

You could also use the transducer frequency, the depth of the sample, the length of the pocket, the transmit power, the focus location, and other system parameters to decide if the data should be weighted heavily, lightly or not at all.

We claim:

1. In apparatus for deriving signals representing the velocity and signals representing the turbulence of fluid flow at different ranges along a line in response to quadrature components of reflections from said ranges of a plurality of bursts of ultrasonic carrier waves transmitted along the line wherein the quadrature components are displaced from each other by 90° of the carrier wave, the combination of
    input circuits to which said quadrature components are to be respectively applied,
    means coupled to said input circuits for deriving first signals respectively indicating the angles represented by the quadrature components,
    means coupled to said latter means for deriving second signals respectively representing the differences between the angles indicated by said first signals for successive bursts at each range,
    means for deriving at least one weighting factor for each of said second signals,
    means for deriving third signals respectively representing the average velocity of fluid flow at each range from the second signals for the range and corresponding weighting factors, and
    means for deriving fourth signals respectively representing the turbulence of fluid flow at each range from the second signals for the range and corresponding weighting factors.

2. A combination as set forth in claim 1, having a further improvement wherein
    means are coupled to said input circuits for deriving the vector amplitudes of said quadrature components, and
    said means for deriving at least one weighting factor for each of said second signals derives weighting factors that are functions of the vector amplitudes of the first signals from which said second signals are derived.

3. A combination as set forth in claim 2 wherein said means for deriving weighting factors derives weighting factors that have a value of unity if the ratio of the value of the function to a threshold value exceeds a given number.

4. A combination as set forth in claim 3 wherein said means for deriving weighting factors derives weighting factors that are the products of the vector amplitudes of the first signals from which said second signals are derived and said threshold value is a constant.

5. In apparatus as set forth in claim 1 the further improvement wherein said means for deriving said third signals and said means for deriving said fourth signals respond to different weighting factors.

6. In apparatus as set forth in claim 1 the further improvement wherein said means for deriving said third signals and said means for deriving said fourth signals respond to the same weighting factors.

7. In apparatus for deriving signals representing the velocity of fluid flow at different ranges along a line in response to quadrature components of reflections from said ranges of a plurality of bursts of ultrasonic carrier waves transmitted along the line wherein the quadrature components are displaced from each other by 90° of the carrier wave, an improvement comprising
    input circuits to which said quadrature components are to be respectively applied,
    means coupled to said input circuits for deriving first signals respectively representing the angles represented by the quadrature componenets,
    means coupled to said latter means for deriving second signals respectively representing the differences between the angles represented by said first signals for successive bursts at each range,
    means for deriving respective weighting factors for said second signals that is a function of at least one of: the time following TGC, the vector amplitudes of said second signals and said second signals, means for deriving the products of said weighting factors and their respective second signals for each range, and means for deriving fourth signals respectively representative of the velocity of flow at each range that is the average of said products.

8. In apparatus for deriving signals representing the turbulence of fluid flow at different ranges along a line in response to quadrature components of reflections from said ranges of a plurality of bursts of ultrasonic carrier waves transmitted along the line wherein the quadrature components are displaced from each other by 90° of the carrier wave, an improvement comprising input circuits to which said quadrature components are to be respectively applied, means coupled to said input circuits for deriving first signals respectively representing the angles represented by the quadrature components, means coupled to said latter means for deriving second signals respectively representing the differences between the angles represented by said first signals for successive bursts at each range, means for deriving respective weighting factors for said second signals that is a function of at least one of: the TGC, the vector amplitudes of said second signals, means for deriving the products of said weighting factors and their respective second signals for each range, and means for deriving a signal indicative of turbulence from said weighting factors and their corresponding second signals.

9. In apparatus for deriving indications of the velocity and turbulence of fluid flow at different ranges along a line in response to quadrature components of reflections from said ranges of a plurality of bursts of ultrasonic carrier waves transmitted along the line wherein the quadrature components are displaced from each other by 90° of the carrier wave, an improvement comprising input circuits to which said quadrature components are to be respectively applied, means coupled to said input circuits for deriving first signals respectively representing the angles represented by the quadrature components, means coupled to said latter means for deriving second signals respectively representing the differences between the angles represented by said first signals for successive bursts at each range, means for deriving at least one weighting factor for each of said second signals, means for deriving the products of said weighting factors and their respective second signals, means for deriving a signal representative of the velocity of flow at a range that is an average of said products for each range, and means for deriving a signal representative of the turbulence of flow at a range from said products.

* * * * *